(12) United States Patent
Hwang et al.

(10) Patent No.: US 11,095,331 B2
(45) Date of Patent: Aug. 17, 2021

(54) ELECTRONIC DEVICE, PROTECTIVE CASE FOR ELECTRONIC DEVICE, AND DISPLAYING METHOD THEREOF

(71) Applicant: Samsung Electronics Co., Ltd., Gyeonggi-do (KR)

(72) Inventors: Jisu Hwang, Gyeonggi-do (KR); Yoonyoung Kim, Gyeonggi-do (KR); Minah Koh, Gyeonggi-do (KR); Younjung Kim, Gyeonggi-do (KR); Hyoungshin Park, Gyeonggi-do (KR); Jookyung Woo, Gyeonggi-do (KR); Hyunjun Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/729,897

(22) Filed: Dec. 30, 2019

(65) Prior Publication Data

US 2020/0220570 A1 Jul. 9, 2020

(30) Foreign Application Priority Data

Jan. 7, 2019 (KR) .................. 10-2019-0001760

(51) Int. Cl.
*H04M 1/00* (2006.01)
*H04B 1/3888* (2015.01)
*H04M 1/02* (2006.01)

(52) U.S. Cl.
CPC ........ *H04B 1/3888* (2013.01); *H04M 1/0254* (2013.01); *H04M 1/0264* (2013.01); *H04M 1/0266* (2013.01)

(58) Field of Classification Search
CPC ............. H04M 1/0216; H04M 1/0254; H04M 1/0264; H04M 1/0266; H04B 1/3827; H04B 1/3888
See application file for complete search history.

(56) References Cited

U.S. PATENT DOCUMENTS 7,747,007 B2 * 6/2010 Hyun ................... H04B 1/3888
  379/437
8,682,606 B2 * 3/2014 Horodezky ........... G06F 1/1624
  702/141

(Continued)

FOREIGN PATENT DOCUMENTS

| KR | 10-2018-0092137 A | 8/2018 |
| KR | 10-2018-0127861 A | 11/2018 |
| WO | 2018/121309 A1 | 7/2018 |

OTHER PUBLICATIONS

International Search Report dated Apr. 27, 2020.

*Primary Examiner* — Nhan T Le
(74) *Attorney, Agent, or Firm* — Cha & Reiter, LLC.

(57) ABSTRACT

A case, an electronic device and a method are disclosed herein. The case is mountable onto the electronic device. The electronic device includes a display, a first sensor, a second sensor different than the first sensor, a processor operatively connected with the display, the first sensor, and the second sensor, and a memory operatively connected with the processor. The processor implements the method, including: display a screen on the display, detect, by the first sensor, whether a first part of a detachable peripheral device is mounted on an outer portion of the electronic device, obtain, by the second sensor, information from a second part of the detachable peripheral device, when the second part is coupled to the first part, and when the first part is detected through the first sensor, and the information is obtained through the second sensor, execute a screen split mode dividing the screen into regions.

18 Claims, 19 Drawing Sheets

(56) References Cited

U.S. PATENT DOCUMENTS

| | | |
|---|---|---|
| 9,491,878 B2 | 11/2016 | Moon et al. |
| 10,133,462 B2 | 11/2018 | Nishioka |
| 10,380,976 B2 | 8/2019 | Chen |
| 10,649,576 B2 | 5/2020 | Moon et al. |
| 2011/0195759 A1* | 8/2011 | Griffin ................ H04M 1/026 455/575.1 |
| 2016/0255736 A1 | 9/2016 | Choi et al. |
| 2017/0024070 A1 | 1/2017 | Moon et al. |
| 2017/0250721 A1 | 8/2017 | Choi et al. |
| 2017/0364249 A1 | 12/2017 | Kumaki |
| 2019/0172422 A1 | 6/2019 | Chen |

* cited by examiner

ELECTRONIC DEVICE, PROTECTIVE CASE FOR ELECTRONIC DEVICE, AND DISPLAYING METHOD THEREOF

CROSS-REFERENCE TO RELATED APPLICATION(S)

This application is based on and claims priority under 35 U.S.C. § 119 to Korean Patent Application No. 10-2019-0001760, filed on Jan. 7, 2019, in the Korean Intellectual Property Office, the disclosure of which is incorporated by reference herein its entirety.

BACKGROUND

1. Field

The disclosure relates to an electronic device and a protective case, and more particularly, to configuring a screen of the electronic based on detecting mounting of the case and extraction of information associated with and/or stored in the case.

2. Description of Related Art

With the development of a digital technology, various electronic devices such as a mobile communication terminal, a personal digital assistant (PDA), an electronic notebook, a smartphone, or a tablet PC have become widespread. The electronic devices often include one or more sensors capable of detecting physical quantities, a change in the physical quantities, or a presence of materials. In addition, various types of other sensors, such as an inertial sensor, a geomagnetic sensor, an illuminance sensor, and a distance sensor, etc. may be provided in these electronic devices.

Part of the success in the widespread adoption of these electronic devices is the implementation of diverse functionality within a compact housing. However, due to their small size, it often happens that as the electronic device is carried, the device is dropped and sometimes damaged as a result. To remedy this issue, an external case is often utilized to protect the electronic device from drops, falls and other such accidents.

Furthermore, these devices are commonly equipped with a display panel to provide visual information for the user. The size of the display panel in these devices has generally increased, and some have transitioned from traditional flat displays into panels having a curvature. Accordingly, thick and heavy cases are sometimes utilizes to protect the electronic device due to the fragility of the display panel and then need to protect the device from external impacts, without obstructing visibility or usage of the display panel. However, the result is often that the device becomes larger, more cumbersome, more difficult to stow and less aesthetically pleasing for users, due to the increased thickness and/or the weight.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method, capable of providing an advanced user experience for a user while protecting an electronic device from the outside.

Another aspect of the disclosure provides an electronic device and a case advanced in an esthetic sense.

In accordance with an aspect of the disclosure, an electronic device may include a display, a first sensor, a second sensor, a processor and a memory. The processor executes instructions stored in the memory to cause the device to display a screen on the display, detect, by the first sensor, whether a first part of a detachable peripheral device is mounted on an outer portion of the electronic device, obtain, by the second sensor, information from a second part of the detachable peripheral device, when the second part is coupled to the first part, and when the first part is detected through the first sensor, and the information is obtained through the second sensor, execute a screen split mode dividing the displayed screen into a plurality of regions.

In accordance with another aspect of the disclosure, a method of an electronic device is disclosed, including displaying a screen, sensing, through a first sensor, whether a first part of a detachable peripheral device is mounted on an outer portion of the electronic device, based on the obtaining of the information from the second part, determining a position on the display to display a split line, and based on detecting the mounting of the first part, executing a screen split mode and displaying the split line at the determined position to divide the displayed screen into a plurality of regions.

In accordance with another aspect of the disclosure, a case detachably mountable to an electronic device is disclosed. The case includes a first housing including a sensing target detectable by the electronic device when the case is mounted on the electronic device, and a second housing detachably coupleable with the first housing when mounted on an outer portion of the electronic device, and including an insertable electronic chip storing identification (ID) information.

Other aspects, advantages, and salient features of the disclosure will become apparent to those skilled in the art from the following detailed description, which, taken in conjunction with the annexed drawings, discloses certain embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

In the following description made with respect to the accompanying drawings, similar components will be assigned with similar reference numerals

DETAILED DESCRIPTION

Hereinafter, certain embodiments of the disclosure may be described with reference to accompanying drawings. However, those of ordinary skill in the art will understand that the disclosure is not limited to a specific embodiment, and modifications, equivalents, and/or alternatives on the certain embodiments described herein can be variously made without departing from the disclosure.

In the disclosure, a standby mode may refer to the state that a display is turned on under lower power while at least one application is being executed in background. The standby mode may be referred to an Always On display (AOD) mode.

In addition, in the disclosure, a lock screen may refer to a screen displayed on a display of an electronic device in a lock state of restricting a control command of a user to prevent the electronic device from operating in response to an unintentional input from the user through an input device included in the electronic device. The lock state may be released when an input corresponding to a set condition is received to the electronic device.

In addition, in the disclosure, a home screen refers to a screen serving as a user interface displayed on the display such that the electronic device executes an application or a function. For example, the home screen may be a screen displayed when the lock state of the electronic device is released. For another example, the home screen may be a screen displayed when a user input is received through a home button provided in the electronic device. In this case, the home button may include, as well as a physical button, a virtual button to receive a touch input or a force-based input to a specific position on a touchscreen.

Figure 1:
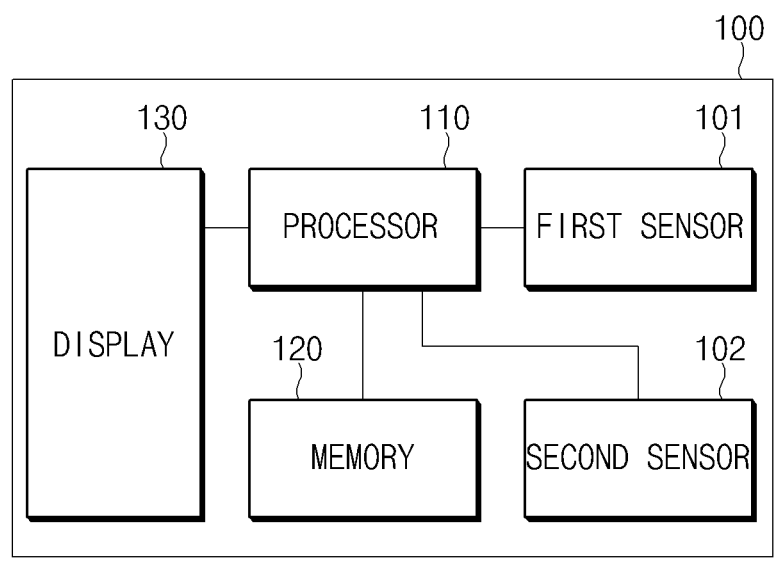
FIG. 1 illustrates the configuration of an electronic device, according to an embodiment.

FIG. 1 illustrates the configuration of an electronic device 100, according to an embodiment.

According to an embodiment, the electronic device 100 may include a first sensor 101, a second sensor 102, a processor 110, a memory 120, and a display 130.

The processor 110 may be operatively connected with the first sensor 101, the second sensor 102, the memory 120, and the display 130. The memory 120 may load instructions executable by the processor 110. The processor 110 may execute the instructions loaded into the memory 120 to control components of the electronic device 100 or to perform operations, such as computations, of the electronic device 100.

According to an embodiment, the first sensor 101 may sense whether a first part 210 of a peripheral device, which is detachably mounted on an outer portion of the electronic device 100, is mounted. The first sensor 101 may include a sensor to sense a physical quality generated when the first part 210 may be positioned at a specific position of the outer portion of the electronic device 100.

Figure 2:
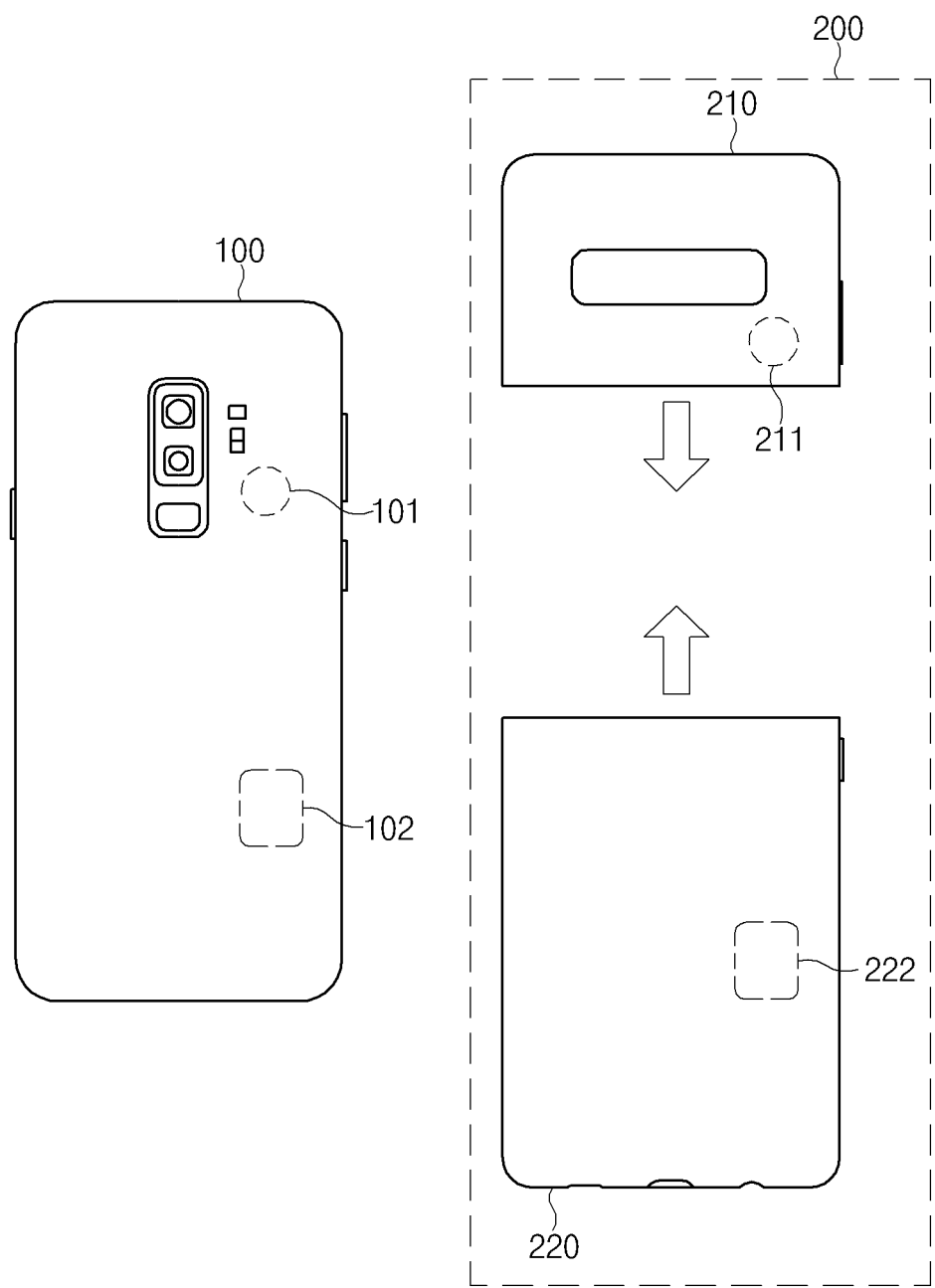
FIG. 2 is an electronic device and a case, according to an embodiment.

FIG. 2 illustrates the case 200, which is a peripheral device that is detachably mounted on the outer portion of the electronic device 100. The case 200 of FIG. 2 may include the first part 210 and a second part 220, which may physically engage with each other, as illustrated.

The electronic device 100 may detect a sensing target 211 included the first part 210 of the peripheral device, when the first part 210 of the case 200 is mounted on an outer portion of the electronic device 100. The first sensor 101 may detect whether the first part 210 is mounted by detect the presence or absence of the sensing target 211, as disposed at a specific location relative to the outer portion of the electronic device 100.

Figures 3A, 3B:
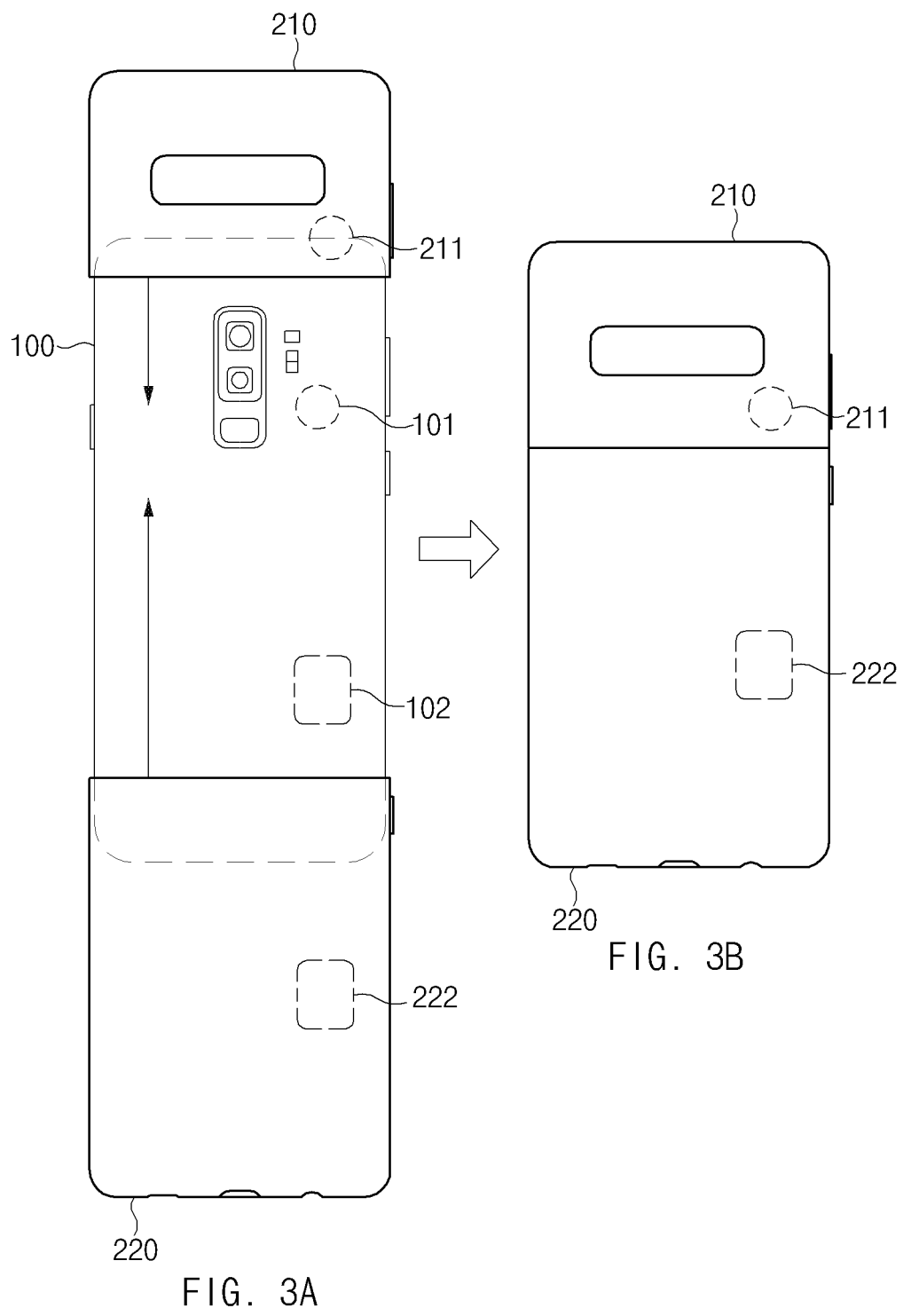
FIGS. 3A and 3B are views illustrating that a case is mounted on an electronic device, according to an embodiment.

Referring to FIG. 3A, during mounting of the case 200 on the electronic device 100, the first part 210 of the case 200 slides onto the electronic device 100 from a first direction, and the second part 220 slides onto the electronic device 100 from an second direction opposite the first direction, together resulting in the case 200 being mounted on the electronic device 100. When the first part 210 is coupled to the second part 220, the sensing target 211 may be disposed at the specific position of the outer portion of the electronic device 100 as illustrated in FIG. 3B, as to be detectable by the first sensor 101. For example, the sensing target 211 may be positioned adjacent to the first sensor 101.

The first sensor 101 may include a capacity to detect a magnetic field. The first sensor 101, when detecting the magnetic field, may generate an electrical signal corresponding to the magnetic field and transmit the electric signal to the processor 110. In addition, the sensing target 211 may include a magnetized material or substance. Thus, the first sensor 101 may transmit, the processor 110, a signal indicating detection of the magnetic field of the sensing target 211, positioned as illustrated in FIG. 3B. In this case, the processor 110 may determine that the case 200 is mounted on the electronic device 100. The electronic device 100 includes a geomagnetic sensor in most of cases. Accordingly, when the geomagnetic sensor provided in the electronic device 100 is used, the first sensor 101 may be configured without changing the configuration of the hardware of the electronic device 100.

For another example, the first sensor 101 may include an electrode, and the sensing target 211 may include a circuitry including a terminal connected with the electrode. As the first part 210 is mounted on the electronic device 100, when the electrode of the first sensor 101 makes contact with the terminal of the sensing target 211, the first sensor 101 may sense that the first part 210 is mounted by using a path formed through the circuitry of the sensing target 211.

The configuration of the first sensor 101 is not limited to the above described example. According to an embodiment, the configuration of the first sensor 101 may be implemented differently from the above-described example.

According to an embodiment, when the first part 210 is sensed based on the signal received from the first sensor 101, the processor 110 may obtain the information on the second part 220 through the second sensor 102.

The second sensor 102 may read the information on the second part 220 out of an information providing medium 222 provided in the second part 220. According to an embodiment, the information on the second part 220 may be information for identifying attributes of the second part 220. For example, the information on the second part 220 may be information for identifying the size, the color, or the shape of the second part 220. According to another embodiment, the information on the second part 220 may be unique identification information uniquely assigned to the second part 220. According to another embodiment, the information on the second part 220 may include information on the size of each of regions for splitting a screen to be displayed on the display 130 or information on the position of the split line.

According to an embodiment, the information providing medium 222 provided in the second part 220 may include an electronic chip to store information on the second part 220. In this case, the second sensor 102 may include a reader which is able to read the information, which is stored in the electronic chip, through a radio frequency (RF) signal. However, the disclosure is not limited thereto. For example, the second sensor 102 may obtain information on the second part 220 from the information providing medium 222 through another unit.

When the first part 210 is mounted on the electronic device 100, but the second part 220 is not mounted on the electronic device 100 normally, the information on the second part 220 may not be obtained. Accordingly, as the peripheral device is mounted on the electronic device 100, the processor 110 may not perform a process to be executed. Alternatively, according to another embodiment, the processor 110 may output a notification message for notifying that the peripheral device is not normally mounted. In this case, the notification message may be output in various forms. For example, the notification message may be output in the form of an image through the display 130. According to another embodiment, the notification message may be output in the form of a sound through a sound output device 1955 of FIG. 9. According to another example, the notification message may be output through a vibration motor (not illustrated) provided in the electronic device 100. The electronic device 100 may induce the user to recognize that the peripheral device is not normally mounted, through the notification message and to remount the peripheral device.

When the information about the second part 220 is obtained, the processor 110 may output a screen corresponding to the information about the second part 220 on the display 130.

According to an embodiment, the processor 110 may output a screen split into a plurality of regions on the display 130. The screen split into the plurality of regions may be a screen for displaying mutually different graphical user interfaces (GUI) or content on the regions. For example, as illustrated in FIG. 3B, when the case 200 is mounted on the electronic device 100, the processor 110 may output the split screen on the display 130 such that the split line is formed at a position for the coupling between the first part 210 and the second part 220. In the disclosure, the split line may refer to a line separately displayed on the screen, but is not limited thereto. For example, the split line may refer to a boundary line to separate the plurality of regions from each other.

The electronic device 100 may provide, for a user, a user experience of providing the sense of unit with hardware by outputting a split screen on the display 130 similarly to the shape of the case 200 mounted on the outer portion of the electronic device 100.

The processor 110 may use information on the second part 220 to determine the position of the split line to split an area of the screen output on the display 130. According to an embodiment, the processor 110 may search the memory 120 for information on the position of the split line corresponding to the information on the second part 220 and may determine the position of the split line based on the searched result. Alternatively, according to another embodiment, the processor 110 may transmit at least a portion of the obtained information on the second part 220 to a server previously specified in the memory 120 through an external network and may receive information on the position of the split line in response to the transmitted information. Alternatively, according to another embodiment, the processor 110 may obtain link information for obtaining information on the peripheral device together with the information on the second part 220, and may receive information on the position of the split line from a server accessible using the link information.

The display 130 may visually provide information under the control of the processor 110. According to an embodiment, the display 130 may include a touchscreen that may receive a touch input, and the electronic device 100 may receive a user input through the display 130. However, the disclosure is not limited thereto, and the electronic device 100 may receive a user input using an additional input device.

Figure 4:
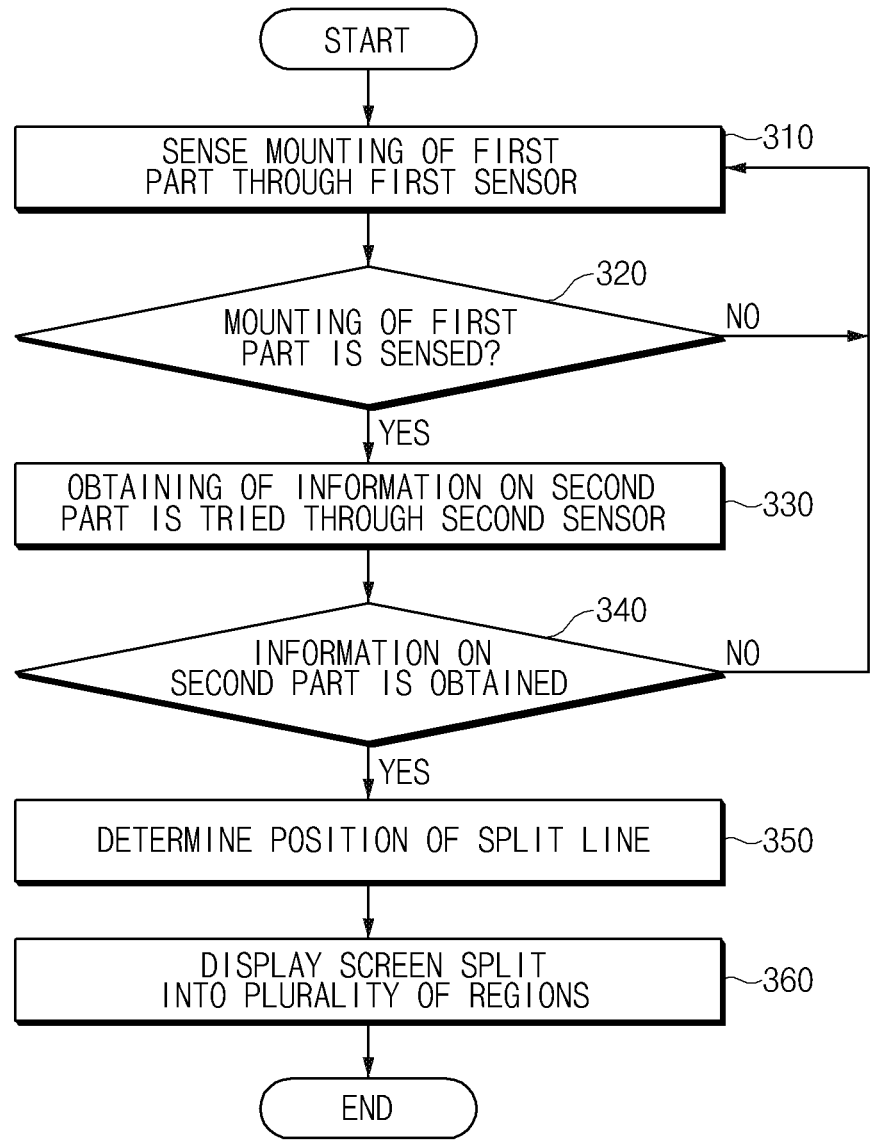
FIG. 4 illustrates a process for an electronic device to display a screen as a case is mounted on the electronic device, according to an embodiment.

FIG. 4 illustrates an example process in which the electronic device displays a screen when the case is mounted on the electronic device, according to an embodiment.

In operation 310, the electronic device 100 may listen for mounting of the first part 210 of the case 200, using the first sensor 101.

In operation 320, when the mounting of the first part 210 is detected, the electronic device 100 may attempt to acquire information on the second part 220 through the second sensor 102 in operation 330. For example, the electronic device 100 may activate of the reader included in the second sensor 102. When the mountain of the first part 210 is not detected, the electronic device 100 may continue listening for mounting of the first part 210 through the first sensor 101.

Thereafter, in operation 340, when the information on the second part 220 is obtained, the electronic device 100 may determine a position of a split line based on the information on the second part 220 obtained in operation 350. When the position of the split line is determined, the electronic device 100 may display the screen split into the plurality of regions, based on the position of the split line in operation 360.

Figure 5A:
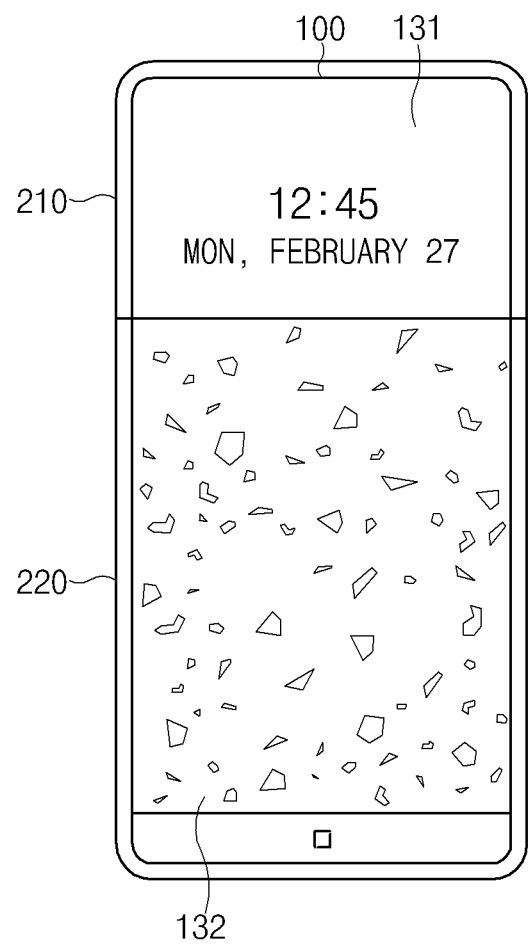
FIGS. 5A and 5B illustrate a screen displayed by an electronic device in a standby mode, according to an embodiment.
Figure 5B:
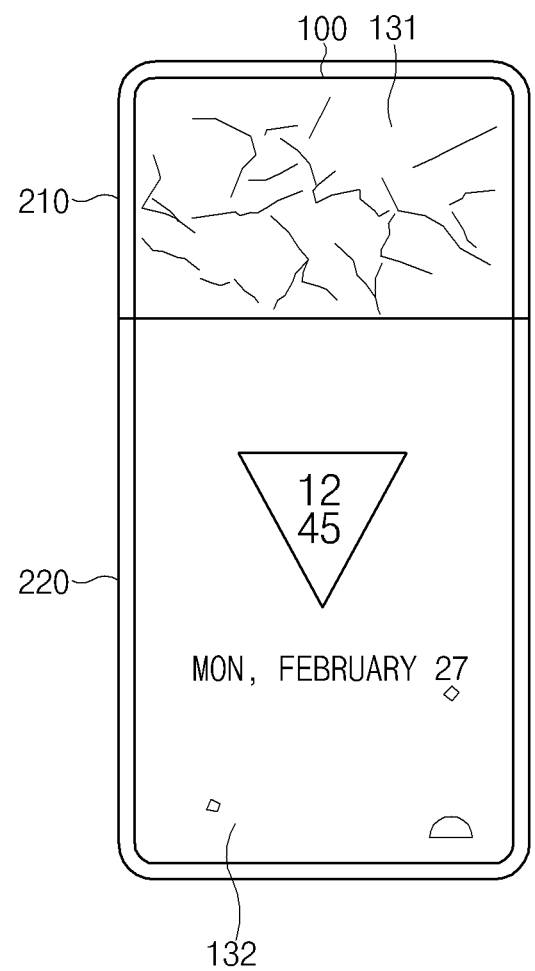

FIGS. 5A and 5B illustrate the screen displayed by the electronic device in the standby mode, according to an embodiment.

According to an embodiment, when the electronic device 100 operates in the standby mode, the electronic device 100 may display, on the display 130, simple information such as time or a date under lower power instead of completely deactivating the display 130.

In this case, referring to FIG. 5A, when the standby mode is executed by the electronic device 100 and the first part 210 and the second part 220 of the peripheral device are mounted on the electronic device 100 are continuously detected, the electronic device 100 may display information, such as a time or a, while the standby mode continues to be executed in the first region 131. In addition, when the electronic device 100 has obtained information on the second part 220, the electronic device 100 may output an image corresponding to the obtained information on the second part 220, to the second region 132. In other words, the electronic device 100 may output an image based on ID information of the second part 220 to display the selected image on at least one of the split regions in the standby mode, depending on a part, which is selected as the second part 220 by a user, of the peripheral device.

In another embodiment, the electronic device 100 may display content corresponding to information obtained from the second part 220 on the first region 131 and may output information, which is set as information to be output in the standby mode, on the second region 132, as illustrated in FIG. 5B.

FIGS. 6 to 10 illustrate the lock screen displayed by the electronic device, according to an embodiment.

Figure 6:
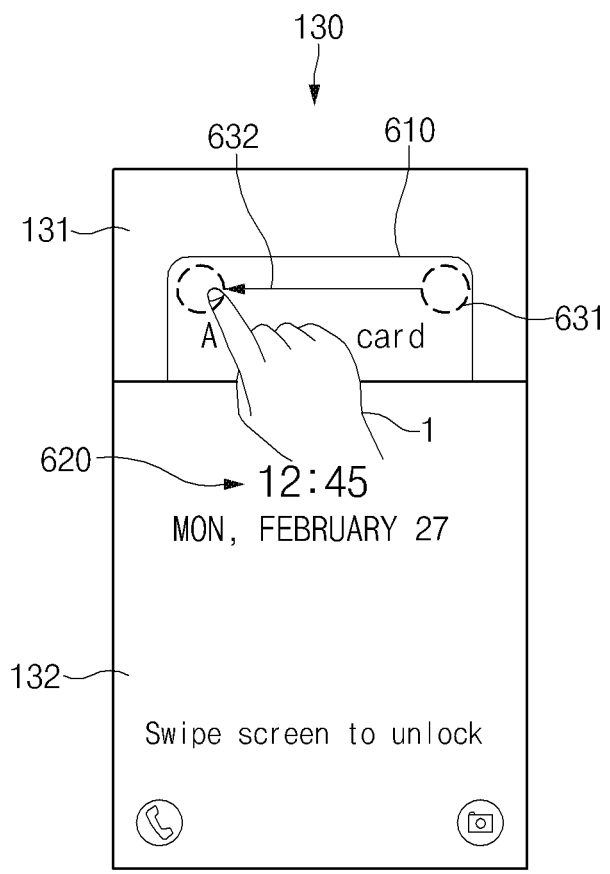
FIGS. 6 to 10 illustrate a lock screen displayed by the electronic device, according to an embodiment.

Referring to FIG. 6, according to an embodiment, the electronic device 100 may output a user interface for selecting a payment unit 610 on the first region 131 of the split regions displayed on the display 30, when the lock screen is output, and when the first part 210 and the second part 220 of the peripheral device are mounted on the electronic device 100. In addition, the electronic device 100 may display a lock screen 620 on the second region 132 of the split regions displayed on the display 130. The screens displayed on the first region 131 and the second region 132 may be interchanged according to an embodiment.

According to an embodiment, a presently selected payment unit 610 (e.g., a payment card) may be displayed on the user interface for allowing user selection. The electronic device 100 may change the selected payment unit 610 based on inputs executed by the user 1. For example, when receiving a touch input swiping in a first direction 632 from a first point 631 in the first region 131, the electronic device 100 may sequentially change the selected payment unit 610 to a next or previous payment unit or card available for executing a payment.

Figure 7:
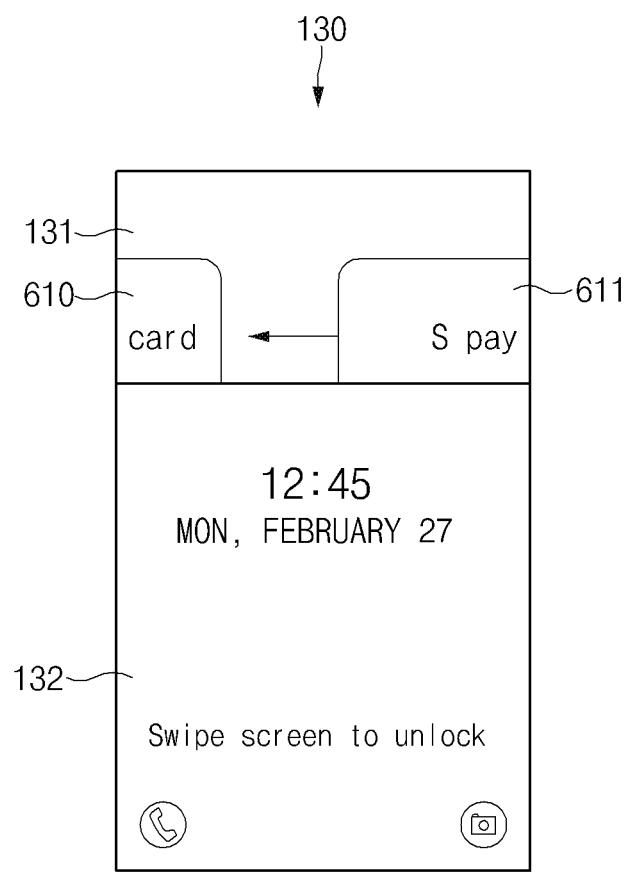

Referring to FIG. 7, as the user input is received, the original payment unit 610, which is conventionally displayed, is removed from display on the screen, and a next payment unit 611 may be displayed on the first region 131.

Figure 8:
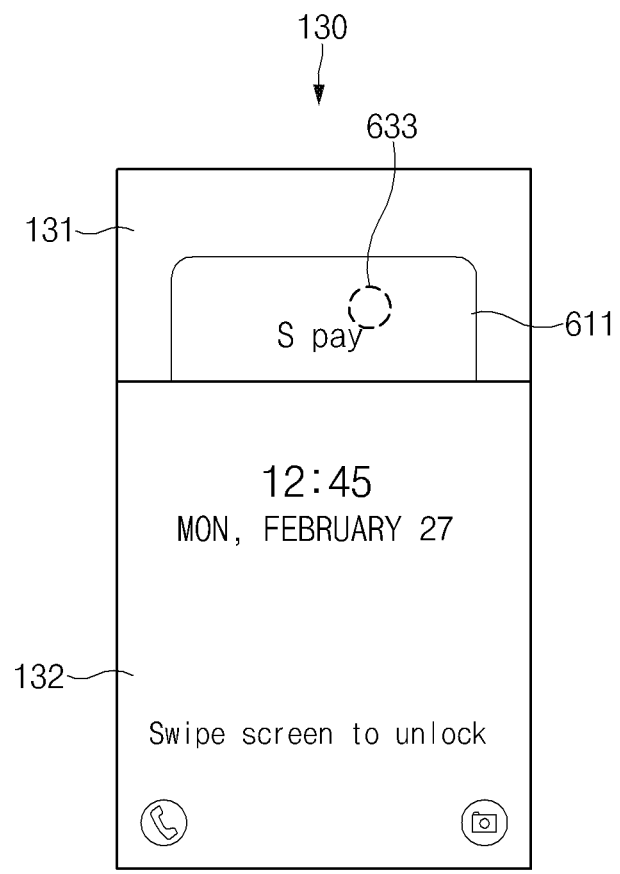

In addition, referring to FIG. 8, the electronic device 100 may receive a user input specifying the payment unit 611 displayed on the first region 131. For example, the electronic device 100 may receive an input touching a second point 633 on the first region 131 in which the payment unit 611 is displayed.

Figure 9:
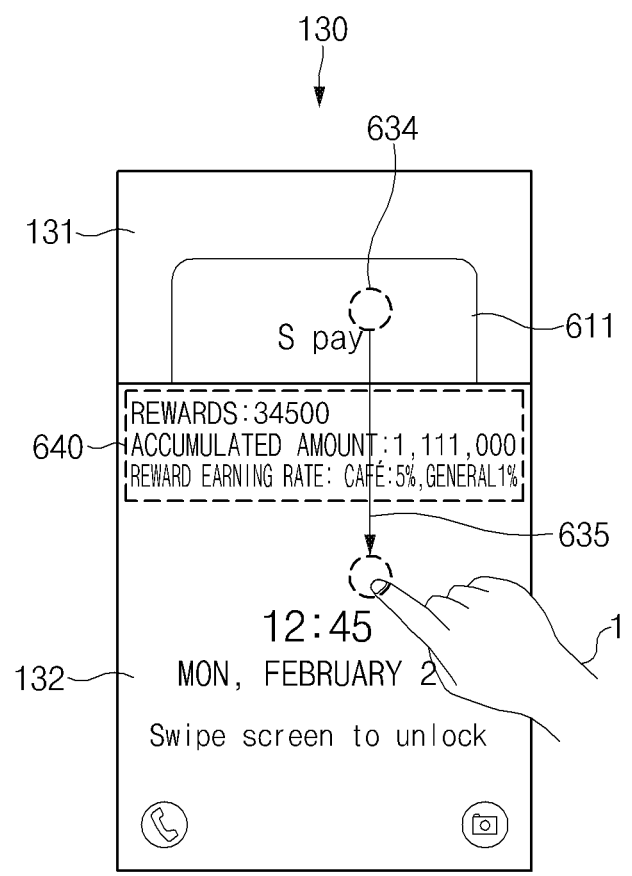

When the electronic device 100 receives the user input for specifying the payment unit 611, the electronic device 100 may display information 640, which is associated with the specified payment unit 611, on the second region 132 In this case, referring to FIG. 9, information 640 associated with the payment unit 611 may include information, such as accumulated reward points, use amount, or a discount rate, on the payment unit 611. Accordingly, the user 1 may easily identify the benefits for the specified payment unit 611 and may determine the payment unit 611 to be used for payment.

In addition, according to an embodiment, the electronic device 100 may receive a user input for executing payment using the selected payment unit 611. For example, referring to FIG. 9, the electronic device 100 may receive a user input swiping in the direction 635 towards or into the second region 132, from a third point 634 in the first region 131 on which the payment unit 511 is displayed.

Figure 10:
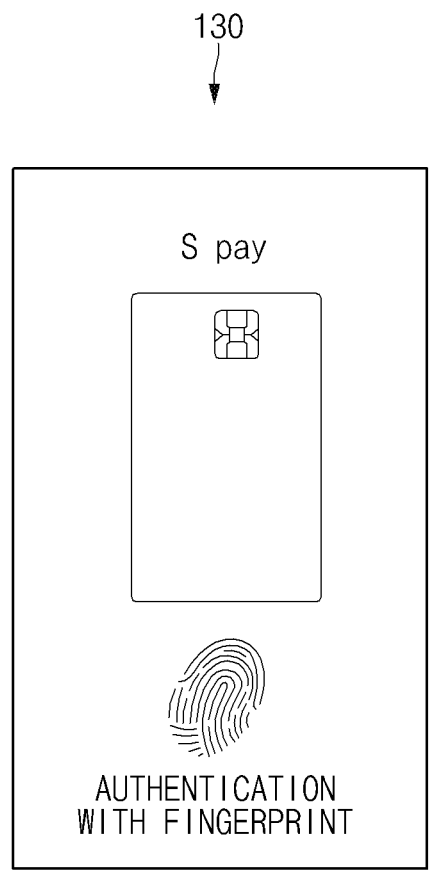

When a user input for performing the payment is received, the electronic device 100 may output, on the display 130, a screen for authenticating the selected payment unit 611. For example, as illustrated in FIG. 10, an authentication check screen for user 1 may be displayed, when user 1 requests executing the payment using the selected payment unit 611 The user input (e.g., in this case, a biometric input of a fingerprint) may determine whether user 1 is authorized to generate the payment.

Figure 11:
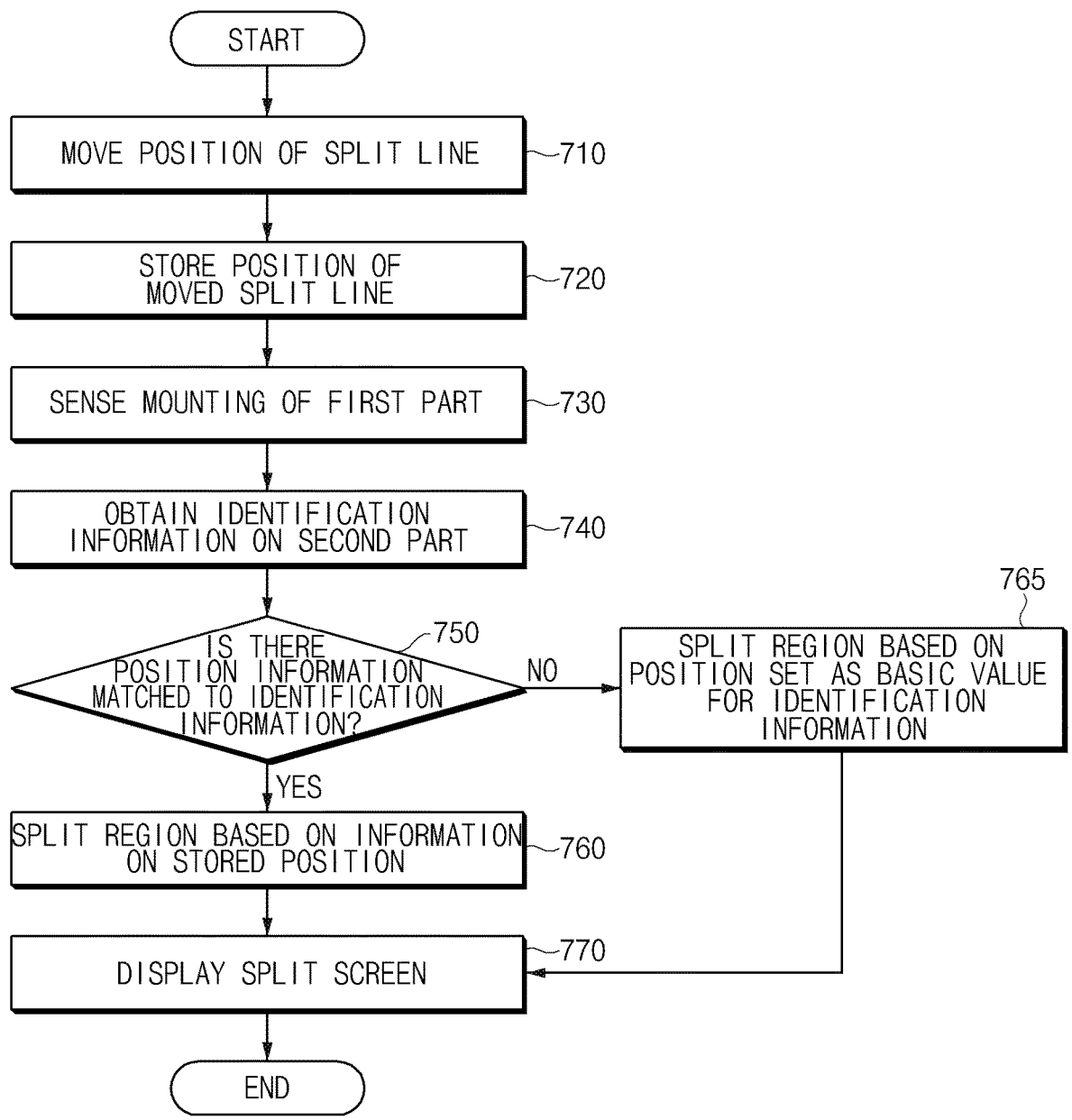
FIG. 11 is a flowchart illustrating a process operated by an electronic device which displays a screen based on a split line set with respect to a peripheral device, according to another embodiment.

FIG. 11 is a flowchart illustrating an example process operated by the electronic device including displaying a screen based on a split line set, with respect to the peripheral device, according to another embodiment. According to an embodiment, the process illustrated in FIG. 11 may be performed after operation S360 of FIG. 4.

According to an embodiment, the electronic device 100 may receive a user input for moving the position of the split line. For example, the electronic device 100 may receive a user input dragging the position of the split line using the touchscreen. In operation 710, the electronic device 100 may move the position of the split line in response to the received user input.

Thereafter, in operation 720, the electronic device 100 may store the position of the moved split line. For example, the electronic device 100 may store the matching result between the position of the moved split line and the information on the second part 220 mounted on the electronic device 100, in the matching table having the matching results between a position of a split line and information on the second part 220 in the memory 120. After storing the position of the split line, the electronic device 100 may sense, through the first sensor 101, that the mounting of the peripheral device is released. For example, when a signal generated through the first sensor 101 is changed to a signal indicating the state that the adjacent sensing target 211 is not sensed through the first sensor 101, the electronic device 100 may recognize that the mounting of the peripheral device is released.

Thereafter, when the peripheral device is mounted on the electronic device 100 again, in operation 730, the electronic device 100 may sense and/or detect the mounting of the first part 210 through the first sensor 101. In operation 740, when the mounting of the first part 210 is detected again, the electronic device 100 may obtain the identification information on the second part 220 through the second sensor 102.

When the identification information is obtained as the result of operation 740, the electronic device 100 may search for information on the position of the split line that matches the obtained identification information. When no information on the position of the split line matching the identification information is found pursuant to the executed search in operation 750, then in operation 765, the electronic device 100 may split the area of the screen to be displayed on the display 130 based on the position set as the basic value for the identification information. In this case, the information on the position set as the basic value for the identification information may be set in the memory 120 of the electronic device 100. Alternatively, the electronic device 100 may receive information on the position set as the basic value for the identification information, as the response to at least a portion of the identification information having transmitted to the external server.

When the information on the position of the split line matched to the identification information is found as the result of the search for the position information in operation 750, then in operation 760, the electronic device 100 may split the area based on the stored information on the position of the split line.

When regions for splitting the screen to be displayed are determined as the result of operation 760 or operation 765, the electronic device 100 may perform operation 770, including outputting images to be displayed on the split regions through the display 130 by performing rendering with respect to the images to be displayed on the split regions.

Figure 12:
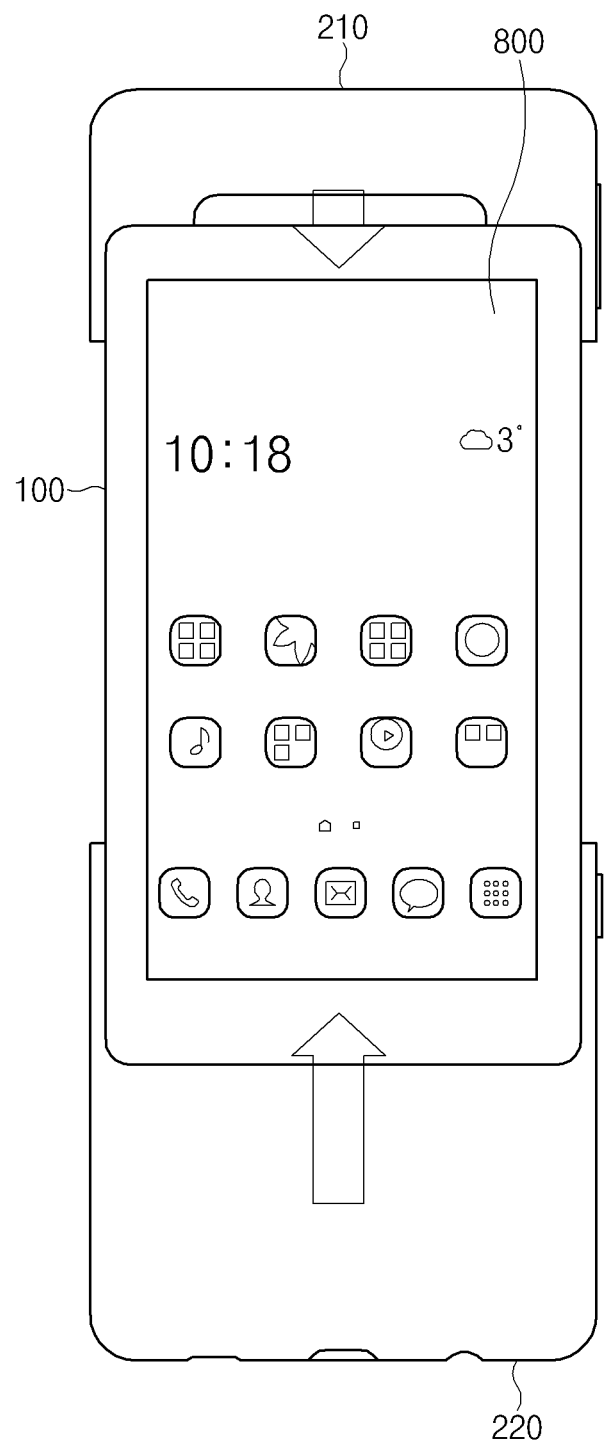
FIGS. 12 to 14 illustrate a home screen displayed by an electronic device, according to an embodiment.
Figure 13:
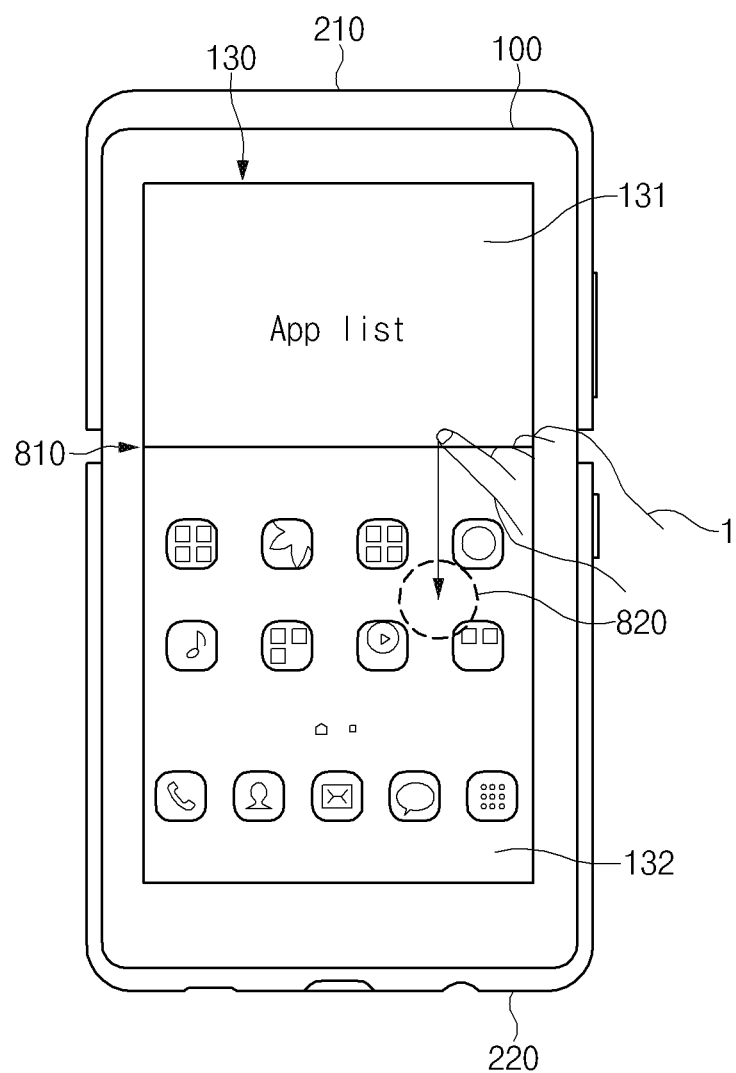
Figure 14:
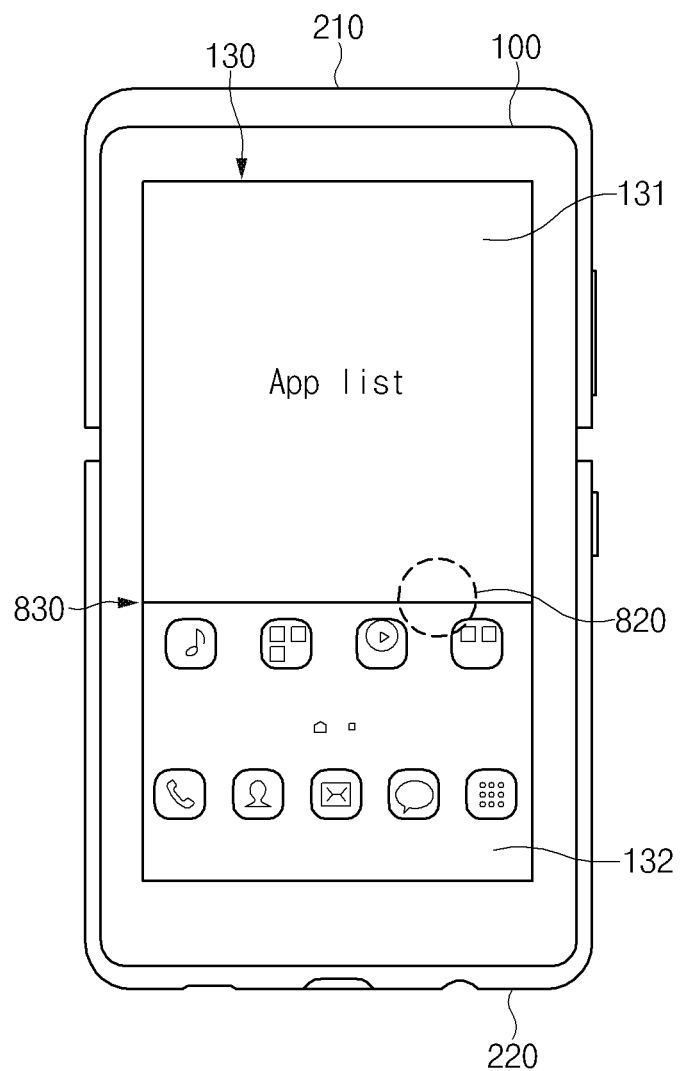

FIGS. 12 to 14 illustrate an example home screen displayed by the electronic device, according to an embodiment.

Referring to FIG. 12, the electronic device 100 may display a home screen 800 including an icon for executing an application, a folder icon, a function button, or a widget. The electronic device 100 may display the home screen 800 on one of the plurality of split regions, when the first part 210 and the second part 220 of the peripheral device are mounted while the home screen 800 is displayed, or when the home screen 800 is displayed while the first part 210 and the second part 220 are mounted.

Referring to FIG. 13, the electronic device 100 may display, through the display 130, a first region 131 and a second region 132 partitioned according to the split line 810. The electronic device 100 may display an application list on the first region 131 and may display the home screen 800 or the reconfigured home screen on the second region 132.

The application list may include an icon or a text for an application which is executable by the electronic device 100. According to an embodiment, the application list may include the list of applications recently executed by the electronic device 100. According to certain embodiments, the application list may include an application list previously configured to be displayed on the first region 131 when the second part 220 of the peripheral device is mounted. The previously set list of the applications may be previously set when the electronic device 100 is manufactured and may be set through a user input.

The reconfigured home screen may refer to the home screen 800 reconfigured such that the home screen is displayed to be matched to the second region 132 displayed on the display 130. According to an embodiment, the reconfigured home screen may be a home screen 800 enlarged or reduced to be matched to the size of the second region 132. According to another embodiment, the reconfigured home screen may be a home screen 800 partially displayed. According to another embodiment, the reconfigured home screen may be a user interface reconfigured again with contents selected from contents, which are displayed by the electronic device 100 on the home screen 800, depending on content attributes.

The electronic device 100 may receive the input of the user 1 for moving the position of a split line 810 in the state that the first region 131 and the second region 132 are displayed. Referring to FIG. 13, when the display 130 is a touch screen, the electronic device 100 may receive a touch input of dragging from an area displayed with the split line 810 on the touchscreen to a fourth point 820 on the display 130. In this case, the area displayed with the split line 810 may further include a surrounding area of the area displayed with the split line 810 as well as an area at which the split line 810 is positioned When the input of the user 1 is received to move the position of the split line 810, the electronic device 100 may change the area of the display 130 on which the first region 131 and the second region 132 are displayed. For example, referring to FIG. 14, the electronic device 100 may change the first region 131 and the second region 132 to display the split line 830 moved to the position of a fourth point 820 which is an end point of the drag input by the user.

According to an embodiment, the electronic device 100 may store information on the position of the moved split line 830. Thereafter, when the peripheral device is separated from the electronic device 100 and the surrounding device is mounted on the electronic device 100 again, the electronic device 100 may display the first region 131 and the second region 132 depending on the position of the moved split line 830.

In addition, according to some embodiments, the electronic device 100 may return the position of the split line 830 to a default position based on the input of the user 1. For example, the electronic device 100 may receive touch inputs, which subsequently made twice with respect to the moved split line 830, in the state that the screen is output on the display 130 such that the moved split line 830 is shown as illustrated in FIG. 14. Thereafter, as illustrated in FIG. 13, the electronic device 100 may output the first region 131 and the second region 132 to the display 130 based on the split line 810.

In addition, according to some embodiments, the electronic device 100 may return a screen output on the display 130 to a screen which is not split, based on the input of the user 1. For example, as illustrated in FIG. 13, in the state that the split screen is output to the display 130, the electronic device 100 may receive a touch input of swiping in the direction of the split line 810 (in the horizontal direction of FIG. 13) from one point of the first region 131. In this case, the electronic device 100 may not display the first region 131 on the display 130, but may display content, which has been displayed on the second region 132 which is a remaining area, on the entire portion of the display 130 as illustrated in FIG. 12.

Figure 15:
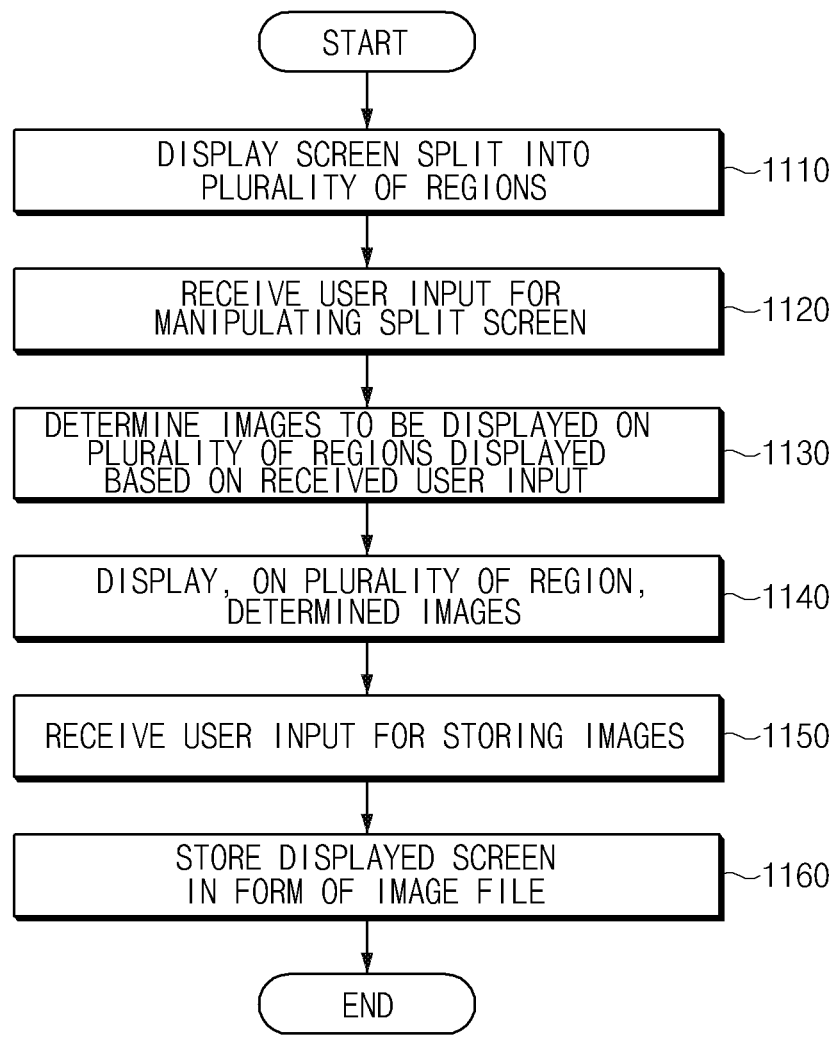
FIG. 15 is a flowchart illustrating the process in which an electronic device mounted with a peripheral device stores an image file, according to still another embodiment.

FIG. 15 is a flowchart illustrating the example process in which the electronic device, when mounted with the peripheral device, stores an image file, according to another embodiment.

The electronic device 100 may perform operation 1110 of displaying an execution screen of a specific function or a specific application in the format of a screen split with a plurality of regions. The split screen may be displayed when performing a specific function of the electronic device 100 or executing a specific application installed in the electronic device 100, and mounting of the peripheral device is detected.

When the split screen is displayed on the display 130, the electronic device 100 may perform operation 1120 including receiving a user input for manipulating the split screen. The user input for manipulating the split screen may include an input for moving the position of the split line or an input for changing content to be displayed on each region included in the split screen.

Thereafter, the electronic device 100 may perform operation 1130, including determining images to be displayed on the plurality of regions displayed, based on the received user input. Thereafter, the electronic device 100 may perform operation 1140 including displaying the determined images on the plurality of regions. For example, the electronic device 100 may interchange and display content displayed on the first region and content displayed on the second region, when the electronic device 100 changes the area of the first region to be wider than the area of the second region, based on a user input for using the split line in the state that the area of the first region of a plurality of split regions is less than the area of the second region.

Alternatively, the electronic device 100 may perform operation 1150 including receiving a user input for storing an image. The user input for storing the image may include, for example, a button input for image capturing or a screen capture command. When the user input for storing the image is received, the electronic device 100 may generate an image depending on areas of the split regions output on the display 130 and store the generated image in the form of an image file in the memory 120 in operation 1160.

However, the embodiment in the disclosure is provided only for the illustrative purpose, and some components may be substituted or omitted, according to an embodiment. For example, the process illustrated in FIG. 15 other than operations 1120 to 1140 may be performed by the electronic device 100.

Figure 16:
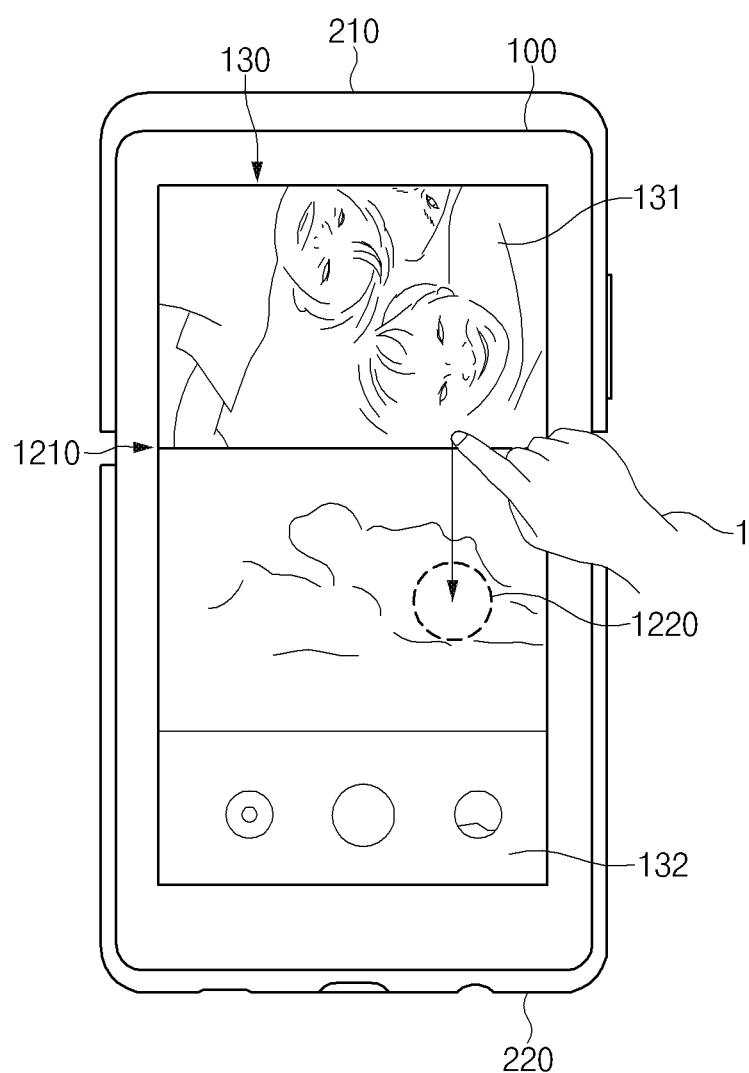
FIGS. 16 to 18 illustrate a screen displayed and an image stored while an electronic device mounted with a peripheral device performs a process of storing the image file according to an embodiment.
Figure 17:
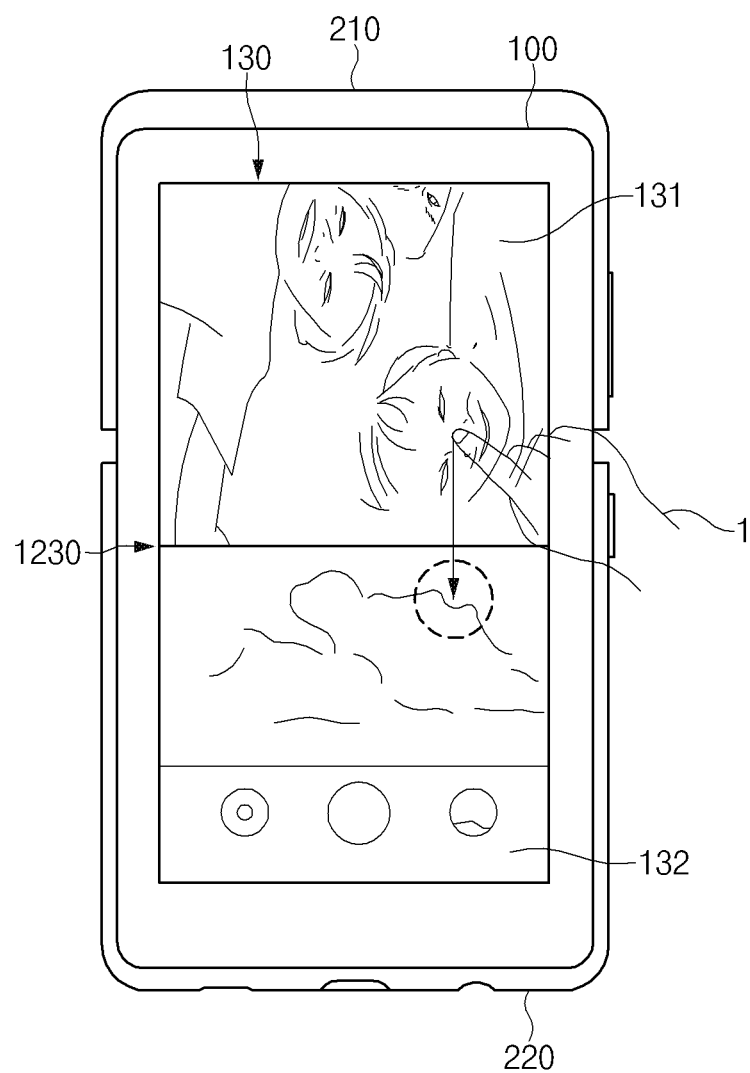
Figure 18:
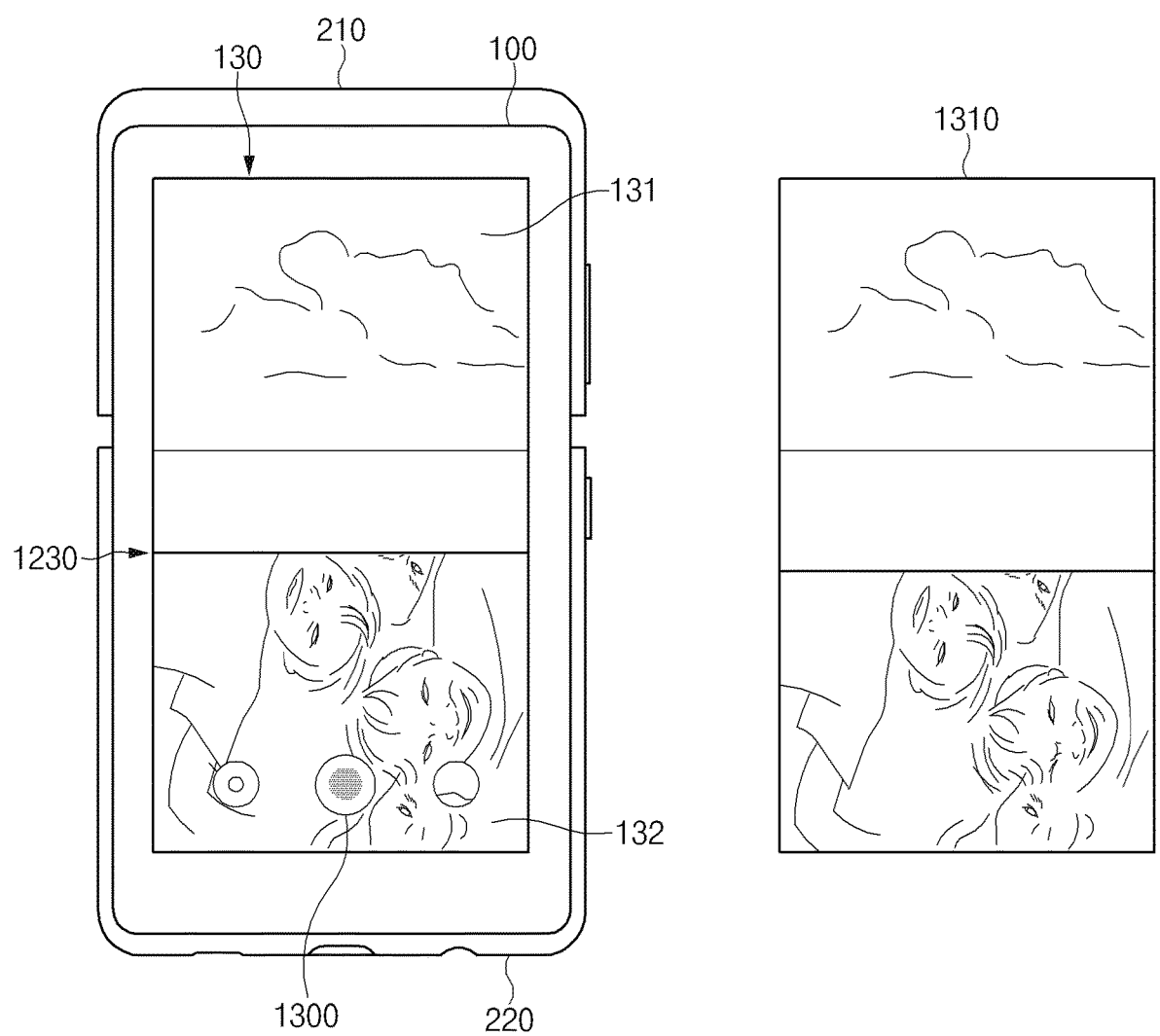

FIGS. 16 to 18 illustrate a screen displayed and an image stored while the electronic device mounted with the peripheral device performs a process of storing an image file, according to an embodiment.

Referring to FIG. 16, when the electronic device 100 executes a camera application in the state that the first part 210 and the second part 220 of the peripheral device are mounted, the electronic device 100 may display the first region 131 and the second region 132 split based on a split line 1210 on the display 130.

According to an embodiment, the electronic device 100 may output, on the first region 131, a preview image (or a first image) obtained through a first lens provided in the electronic device 100. The first lens may include, for example, a lens provided to face a front surface (a surface of the display 130 for displaying the screen). In addition, the electronic device 100 may output a preview image (or a second image) obtained through a second lens provided on the rear surface (e.g., a surface opposite to a surface having the first lens) of the electronic device 100.

In addition, the electronic device 100 may receive an input of the user 1 for moving the position of the split line 1210. For example, referring to FIG. 16, the electronic device 100 may receive a touch input of the user 1 for dragging from a position at which the split line 1210 is shown to a fifth point 1220. The electronic device 100 may adjust the area ratio between the first region 131 and the second region 132 depending on the input for moving the position of the split line 1210.

Referring to FIG. 17, the electronic device 100 may output preview images to the first region 131 and the second region 132 splitting a screen based on the position of a split line 1230 moved based on the input of the user 1.

In addition, the electronic device 100 may receive an input of a user 1 for changing content displayed on the first region 131 and the second region 132. For example, referring to FIG. 17, the electronic device 100 may receive a touch input of dragging from one point of the first region 131 toward one point in the second region 132 on the display 130 including a touchscreen. According to an embodiment, the electronic device 100 may output the second image to the first region 131 and may output the first image to the second region 132 after receiving the touch input, as illustrated in FIG. 18.

In addition, the electronic device 100 may receive a user input for storing an image. For example, referring to FIG. 8, the electronic device 100 may receive a touch input for a shooting button 1300 displayed on the display 130. When receiving the touch input for the shooting button 1300, the electronic device 100 may store, in the memory 120, an image 1310 obtained by combining an image obtained through the first lens and an image obtained through the second image based on the area ratio between the first region 131 and the second region 132, which is determined based on the position of the split line 1230.

As illustrated in FIGS. 16 to 18, as the peripheral device is mounted on the electronic device 100, an image shooting mode is provided by utilizing a plurality of cameras, thereby providing, for the user, a new function depending on the mounting of the peripheral device.

Figure 19:
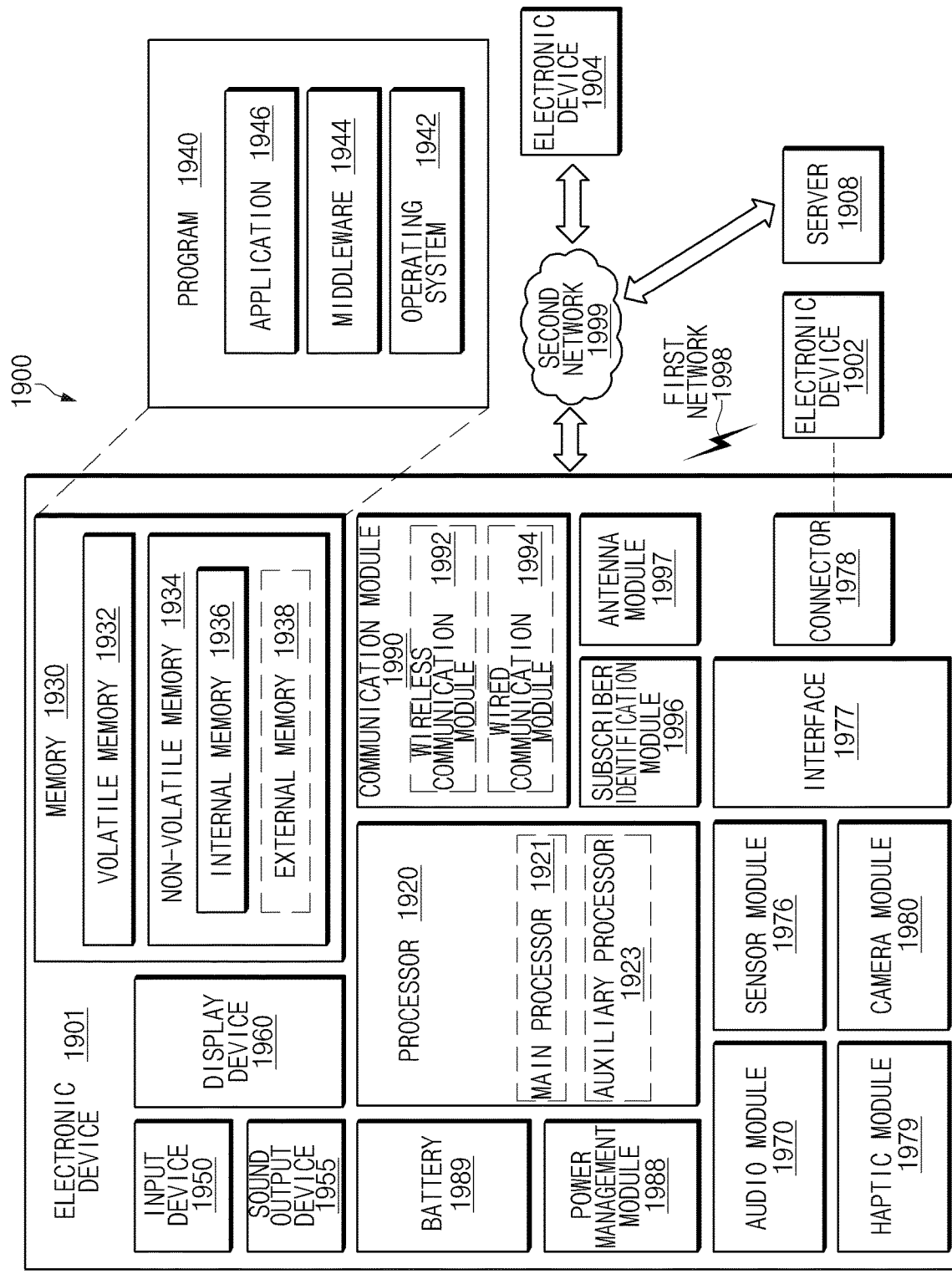
FIG. 19 is a block diagram illustrating an electronic device in a network environment according to certain embodiments.

FIG. 19 is a block diagram illustrating an electronic device 1901 in a network environment 1900 according to certain embodiments. Referring to FIG. 19, the electronic device 1901 in the network environment 1900 may communicate with an electronic device 1902 via a first network 1998 (e.g., a short-range wireless communication network), or an electronic device 1904 or a server 1908 via a second network 1999 (e.g., a long-range wireless communication network). According to an embodiment, the electronic device 1901 may communicate with the electronic device 1904 via the server 1908. According to an embodiment, the electronic device 1901 may include a processor 1920, memory 1930, an input device 1950, a sound output device 1955, a display device 1960, an audio module 1970, a sensor module 1976, an interface 1977, a haptic module 1979, a camera module 1980, a power management module 1988, a battery 1989, a communication module 1990, a subscriber identification module (SIM) 1996, or an antenna module 1997. In some embodiments, at least one (e.g., the display device 1960 or the camera module 1980) of the components may be omitted from the electronic device 1901, or one or more other components may be added in the electronic device 1901. In some embodiments, some of the components may be implemented as single integrated circuitry. For example, the sensor module 1976 (e.g., a fingerprint sensor, an iris sensor, or an illuminance sensor) may be implemented as embedded in the display device 1960 (e.g., a display).

The processor 1920 may execute, for example, software (e.g., a program 1940) to control at least one other component (e.g., a hardware or software component) of the electronic device 1901 coupled with the processor 1920, and may perform various data processing or computation. According to an embodiment, as at least part of the data processing or computation, the processor 1920 may load a command or data received from another component (e.g., the sensor module 1976 or the communication module 1990) in volatile memory 1932, process the command or the data stored in the volatile memory 1932, and store resulting data in non-volatile memory 1934. According to an embodiment, the processor 1920 may include a main processor 1921 (e.g., a central processing unit (CPU) or an application processor (AP)), and an auxiliary processor 1923 (e.g., a graphics processing unit (GPU), an image signal processor (ISP), a sensor hub processor, or a communication processor (CP)) that is operable independently from, or in conjunction with, the main processor 1921. Additionally or alternatively, the auxiliary processor 1923 may be adapted to consume less power than the main processor 1921, or to be specific to a specified function. The auxiliary processor 1923 may be implemented as separate from, or as part of the main processor 1921.

The auxiliary processor 1923 may control at least some of functions or states related to at least one component (e.g., the display device 1960, the sensor module 1976, or the communication module 1990) among the components of the electronic device 1901, instead of the main processor 1921 while the main processor 1921 is in an inactive (e.g., sleep) state, or together with the main processor 1921 while the main processor 1921 is in an active state (e.g., executing an application). According to an embodiment, the auxiliary processor 1923 (e.g., an image signal processor or a communication processor) may be implemented as part of another component (e.g., the camera module 1980 or the communication module 1990) functionally related to the auxiliary processor 1923.

The memory 1930 may store various data used by at least one component (e.g., the processor 1920 or the sensor module 1976) of the electronic device 1901. The various data may include, for example, software (e.g., the program 1940) and input data or output data for a command related thereto. The memory 1930 may include the volatile memory 1932 or the non-volatile memory 1934.

The program 1940 may be stored in the memory 1930 as software, and may include, for example, an operating system (OS) 1942, middleware 1944, or an application 1946.

The input device 1950 may receive a command or data to be used by other component (e.g., the processor 1920) of the electronic device 1901, from the outside (e.g., a user) of the electronic device 1901. The input device 1950 may include, for example, a microphone, a mouse, a keyboard, or a digital pen (e.g., a stylus pen).

The sound output device 1955 may output sound signals to the outside of the electronic device 1901. The sound output device 1955 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1960 may visually provide information to the outside (e.g., a user) of the electronic device 1901. The display device 1960 may include, for example, a display, a hologram device, or a projector and control circuitry to control a corresponding one of the display, hologram device, and projector. According to an embodiment, the display device 1960 may include touch circuitry adapted to detect a touch, or sensor circuitry (e.g., a pressure sensor) adapted to measure the intensity of force incurred by the touch.

The audio module 1970 may convert a sound into an electrical signal and vice versa. According to an embodiment, the audio module 1970 may obtain the sound via the input device 1950, or output the sound via the sound output device 1955 or a headphone of an external electronic device (e.g., an electronic device 1902) directly (e.g., wiredly) or wirelessly coupled with the electronic device 1901.

The sensor module 1976 may detect an operational state (e.g., power or temperature) of the electronic device 1901 or an environmental state (e.g., a state of a user) external to the electronic device 1901, and then generate an electrical signal or data value corresponding to the detected state. According to an embodiment, the sensor module 1976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1977 may support one or more specified protocols to be used for the electronic device 1901 to be coupled with the external electronic device (e.g., the electronic device 1902) directly (e.g., wiredly) or wirelessly. According to an embodiment, the interface 1977 may include, for example, a high definition multimedia interface (HDMI), a universal serial bus (USB) interface, a secure digital (SD) card interface, or an audio interface.

A connecting terminal 1978 may include a connector via which the electronic device 1901 may be physically connected with the external electronic device (e.g., the electronic device 1902). According to an embodiment, the connecting terminal 1978 may include, for example, a HDMI connector, a USB connector, a SD card connector, or an audio connector (e.g., a headphone connector).

The haptic module 1979 may convert an electrical signal into a mechanical stimulus (e.g., a vibration or a movement) or electrical stimulus which may be recognized by a user via his tactile sensation or kinesthetic sensation. According to an embodiment, the haptic module 1979 may include, for example, a motor, a piezoelectric element, or an electric stimulator.

The camera module 1980 may capture a still image or moving images. According to an embodiment, the camera module 1980 may include one or more lenses, image sensors, image signal processors, or flashes.

The power management module 1988 may manage power supplied to the electronic device 1901. According to an embodiment, the power management module 1988 may be implemented as at least part of, for example, a power management integrated circuit (PMIC).

The battery 1989 may supply power to at least one component of the electronic device 1901. According to an embodiment, the battery 1989 may include, for example, a primary cell which is not rechargeable, a secondary cell which is rechargeable, or a fuel cell.

The communication module 1990 may support establishing a direct (e.g., wired) communication channel or a wireless communication channel between the electronic device 1901 and the external electronic device (e.g., the electronic device 1902, the electronic device 1904, or the server 1908) and performing communication via the established communication channel. The communication module 1990 may include one or more communication processors that are operable independently from the processor 1920 (e.g., the application processor (AP)) and supports a direct (e.g., wired) communication or a wireless communication. According to an embodiment, the communication module 1990 may include a wireless communication module 1992 (e.g., a cellular communication module, a short-range wireless communication module, or a global navigation satellite system (GNSS) communication module) or a wired communication module 1994 (e.g., a local area network (LAN) communication module or a power line communication (PLC) module). A corresponding one of these communication modules may communicate with the external electronic device via the first network 1998 (e.g., a short-range communication network, such as Bluetooth™, wireless-fidelity (Wi-Fi) direct, or infrared data association (IrDA)) or the second network 1999 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1992 may identify and authenticate the electronic device 1901 in a communication network, such as the first network 1998 or the second network 1999, using subscriber information (e.g., international mobile subscriber identity (IMSI)) stored in the subscriber identification module 1996.

The antenna module 1997 may transmit or receive a signal or power to or from the outside (e.g., the external electronic device) of the electronic device 1901. According to an embodiment, the antenna module 1997 may include an antenna including a radiating element implemented by a conductive material or a conductive pattern formed in or on a substrate (e.g., PCB). According to an embodiment, the antenna module 1997 may include a plurality of antennas. In such a case, at least one antenna appropriate for a communication scheme used in the communication network, such as the first network 1998 or the second network 1999, may be selected, for example, by the communication module 1990 (e.g., the wireless communication module 1992) from the plurality of antennas. The signal or the power may then be transmitted or received between the communication module 1990 and the external electronic device via the selected at least one antenna. According to an embodiment, another component (e.g., a radio frequency integrated circuit (RFIC)) other than the radiating element may be additionally formed as part of the antenna module 1997.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1901 and the external electronic device 1904 via the server 1908 coupled with the second network 1999. Each of the electronic devices 1902 and 1904 may be a device of a same type as, or a different type, from the electronic device 1901. According to an embodiment, all or some of operations to be executed at the electronic device 1901 may be executed at one or more of the external electronic devices 1902, 1904, or 1908. For example, if the electronic device 1901 should perform a function or a service automatically, or in response to a request from a user or another device, the electronic device 1901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1901. The electronic device 1901 may provide the outcome, with or without further processing of the outcome, as at least part of a reply to the request. To that end, a cloud computing, distributed computing, or client-server computing technology may be used, for example.

According to some embodiments, when the display 130 of FIG. 1 is configured to include a touchscreen, the display 130 may perform both functions of the input device 1950 of FIG. 19 and the display device 1960. In addition, according to some embodiments, at least one of the first sensor 101 and the second sensor 102 of FIG. 1 may be implemented by using at least one of the sensor module 1976, the communication module 1990, the antenna module 1997, and the connecting terminal 1978 of FIG. 19.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program #40) including one or more instructions that are stored in a storage medium (e.g., internal memory #36 or external memory #38) that is readable by a machine (e.g., the electronic device #01). For example, a processor (e.g., the processor #20) of the machine (e.g., the electronic device #01) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

According to an embodiment of the disclosure, an advanced user experience may be provided for a user using the electronic device or the protective case Besides, a variety of effects directly or indirectly understood through the disclosure may be provided.

While the disclosure has been shown and described with reference to certain embodiments thereof, it will be understood by those skilled in the art that various changes in form and details may be made therein without departing from the disclosure as defined by the appended claims and their equivalents.

What is claimed is:

1. An electronic device, comprising:
a display;
a first sensor;
a second sensor different than the first sensor;
a processor operatively connected with the display, the first sensor, and the second sensor; and
a memory operatively connected with the processor,
wherein the memory stores instructions that, when executed, cause the processor to:
display a screen on the display;
detect, by the first sensor, whether a first part of a detachable peripheral device is mounted on an outer portion of the electronic device,
obtain, by the second sensor, information from a second part of the detachable peripheral device, when the mounting of the first part is detected, and
when the first part is detected through the first sensor, and the information is obtained through the second sensor, execute a screen split mode dividing the displayed screen into a plurality of regions,
wherein the information obtained from the second part includes at least one of identification (ID) information or attributes related to the detachable peripheral device, and the plurality of regions are determined based on the obtained information.

2. The electronic device of claim 1, wherein the second sensor includes:
a reader configured to obtain the information from an electronic chip disposed in the detachable peripheral device,
wherein the information is obtained from the second part using the reader, and
wherein executing the screen split mode further includes displaying a split line dividing the displayed screen into the plurality of regions, in which a position of the split line is based on the ID information.

3. The electronic device of claim 2, wherein the first sensor is configured to sense a magnetic field, and wherein the first part of a detachable peripheral device includes a magnetic substance detectable by the first sensor.

4. The electronic device of claim 2, wherein the instructions further cause the processor to:
in response to detecting a user input, move the position of the split line to a new position; and
store, in the memory the new position of the split line, wherein executing the screen split mode further includes displaying the split line at the stored new position.

5. The electronic device of claim 2, wherein the instructions further cause the processor to:
after obtaining the information including the ID information and mounting of the first part of the detachable peripheral device, output an image corresponding to the ID information to a first region of the plurality of regions, and output information for a standby mode to a second region of the plurality of regions, when the display is in the standby mode,
wherein the standby mode includes a low-power activation of the display.

6. The electronic device of claim 1, wherein the instructions further cause the processor to:
output a user interface including display of one or more selectable payment accounts to a first region of the plurality of regions, and output a lock screen to a second region of the plurality of regions.

7. The electronic device of claim 6, wherein outputting the user interface includes displaying first payment information associated with the one or more selectable payment accounts.

8. The electronic device of claim 7, wherein the instructions further cause the processor to:
display second payment information associated with the one or more payment accounts to the second region, based on receiving a user input selecting a payment account displayed to the first region.

9. The electronic device of claim 7, wherein the instructions further cause the processor to:
based on receiving a swipe input moving from the first region to the second region when the one or more selectable payment accounts are displayed, output to the display a security screen requesting input of user authentication.

10. The electronic device of claim 1, wherein the instructions further cause the processor to:
display an application list on a first region of the plurality of regions, and output a home screen to a second region of the plurality of regions.

11. The electronic device of claim 10, wherein the list indicates applications recently executed by the electronic device, or applications previously set to be displayed on the first region.

12. The electronic device of claim 1, wherein the electronic device further includes:
a camera module including a first lens and a second lens, and
wherein the instructions further cause the processor to:
display a first image, obtained through the first lens, to a first region of the plurality of regions; and
display a second image, obtained through the second lens, to a second region of the plurality of regions.

13. The electronic device of claim 12, wherein the electronic device further includes:
a non-volatile storage medium, and
wherein the instructions further cause the processor to:

store, in the non-volatile storage medium, a combined image file generated by combining the first image and the second image according to an area ratio as defined by respective display sizes of the first region and the second region.

14. The electronic device of claim 12, wherein the instructions cause the processor to:
    display the second image to the first region, and display the first image to the second region, based on receiving a drag input starting from the first region and ending at the second region.

15. A method of an electronic device, the method comprising:
    displaying, on a display, a screen;
    sensing, through a first sensor, whether a first part of a detachable peripheral device is mounted on an outer portion of the electronic device;
    obtaining, through a second sensor, information from a second part of the detachable peripheral device when the mounting of the first part is detected;
    based on the obtaining of the information from the second part, determining a position on the display to display a split line, wherein the information includes at least one of identification (ID) information or attributes related to the detachable peripheral device; and
    based on detecting the mounting of the first part, executing a screen split mode and displaying the split line at the determined position to divide the displayed screen into a plurality of regions based on the obtained information.

16. The method of claim 15, wherein the obtaining the information from the second part further includes:
    reading the ID information related to the detachable peripheral device included in the obtained information from an electronic chip disposed in the second part.

17. The method of claim 16, wherein the first sensor is configured to detect a magnetic field, and the detachable peripheral device further includes a magnetic substance detectable by the first sensor, and
    wherein the detachable peripheral device is detected as mounted on the electronic device, when the first sensor detects the magnetic substance approaching a specific position of an outer portion of the electronic device.

18. The method of claim 16, further comprising:
    receiving a user input moving a position of the split line to a new position;
    storing the new position of the split line in a memory;
    when a signal is received from the first sensor indicating that the first part is dismounted, removing the screen split mode from the display;
    detecting through the first sensor remounting of the first part of the detachable peripheral device on the electronic device; and
    based at least on the detected remounting of the first part, retrieving the stored new position from the memory and re-executing the screen split mode by displaying the split line at the retrieved new position.

* * * * *